United States Patent Office 3,357,953
Patented Dec. 12, 1967

3,357,953
POLYMERIZATION OF TRIOXANE
Michael William Baumber, Colchester, Essex, England, assignor to Bakelite Xylonite Limited, London, England, a British company
No Drawing. Filed Feb. 7, 1964, Ser. No. 343,217
Claims priority, application Great Britain, Feb. 12, 1963, 5,616/63; May 24, 1963, 20,756/63
10 Claims. (Cl. 260—67)

The present invention relates to the production of polyoxymethylenes. In particular it relates to the polymerization and copolymerization of trioxane to give high molecular weight polymers.

It is stated in United States Patent 2,795,571 that tough, high molecular weight polyoxymethylene can be produced in high yields by polymerizing trioxane under anhydrous conditions and in contact with a catalyst consisting of selected inorganic fluorides. It is found, however, that the selected fluorides lead to very slow rates of polymerization. Boron trifluoride has been proposed for the polymerization of trioxane but, although an effective catalyst, it suffers from the disadvantage that it has to be handled as a gas or as a complex.

It is an object of the present invention to provide an improved process for the production of polyoxymethylenes from trioxane involving the use of an active, yet easily handleable, catalyst system.

According to the present invention the process for the preparation of polymers of trioxane comprises polymerizing or copolymerizing trioxane in the presence of fluoroboric acid as polymerization catalyst.

Fluoroboric acid is an active polymerization catalyst which causes rapid polymerization. Preferably it is employed in a concentration of 0.001% to 0.1% based on the weight of trioxane present. Fluoroboric acid is normally obtained as a 40 to 41% weight aqueous solution. Although this is an active catalyst for trioxane polymerization, it is preferred to use a more concentrated acid solution because it gives higher polymerization rates and molecular weights under the same conditions. A suitable acid has a concentration of 81% by weight.

Polymerization occurs over a wide range of temperatures, for instance between −20° C. and 180° C. At higher temperatures depolymerization of the formed polymer may occur. The preferred polymerization temperature range is 40° C. to 80° C.

The polymerization reaction is preferably carried out under completely anhydrous conditions. Small amounts of water e.g. the water added with the catalyst system, do not prevent polymerization although they may lower the molecular weight of the product.

The polymerization can be carried out in the absence or the presence of an inert diluent which may be a hydrocarbon or halogenated hydrocarbon such as cyclohexane or ethylene dichloride. If a diluent is used, the trioxane (including any copolymerizable material) is preferably present in a concentration higher than 15% by weight.

Cyclic ethers containing at least two adjacent carbon atoms such as ethylene oxide are examples of materials which can be copolymerized with trioxane according to the process of the present invention. Normally such copolymerizable compounds are present in a concentration such that the resultant copolymer contains from 1 to 15% by weight of polymer units derived from the compounds.

Polymer produced according to the present invention may be stabilized by esterification, for example by reaction with acid anhydrides in the presence of pyridine, or by etherification to give highly stable products.

A particular advantage of the process of the present invention is that any fluoroboric acid residues may be easily removed from the polymer by washing after the mother liquor has been removed. As a result the process of the present invention can be readily operated without neutralization on the catalyst.

Accordingly a modification of the present invention is a process for the production of polymers of trioxane which comprises polymerizing or copolymerizing trioxane in the presence of fluoroboric acid as polymerization catalyst and isolating the polymer without using a neutralizing step in the isolation procedure.

By a neutralizing step is meant any step in which the produced polymer is treated with a base material under conditions which form a salt of any free fluoroboric acid present.

A particular use of the process according to the present invention is in the production of polymers of trioxane by a continuous process in which polymer is continuously isolated and the reaction mixture containing unpolymerized trioxane is then recycled to the polymerization zone with the addition of further supplies of trioxane and, if desired, catalyst. Such a process is difficult to operate if a neutralizing agent has to be added continuously to the reaction mixture as the trioxane polymer is isolated.

The process of the present invention enables a continuous process for the production of trioxane polymer to be carried out using a relatively low degree of conversion of monomer to polymer before the latter is isolated and the former recycled. The advantages of such a lower degree of conversion are as follows:

(a) A high concentration of trioxane can be maintained in the reaction zone resulting in the formation of high molecular weight polymer, and (b) The low concentration of polymer produces a slurry of low viscosity which can be circulated easily in a continuous process.

The following examples illustrate the process of the present invention.

*Example 1*

A solution containing 250 grams of trioxane in 400 grams of ethylene dichloride was passed down an activated alumina column into a 700 millilitre reaction vessel fitted with a stainless steel stirrer, a source of dry nitrogen and a rubber cap. The apparatus was thoroughly purged with dry nitrogen and the temperature of the stirred solution was raised to 70° C. 0.03 millilitre of 81% fluoroboric acid was injected into the solution through the rubber cap by means of a micro syringe. Polymer started to form immediately and the contents of the reaction vessel solidified after 10 seconds. After 3 minutes the solid polymer was removed and ground in a pestle and mortar. The polymer powder was washed with 300 millilitres of ethylene dichloride and 25 millilitres of tri-n-butylamine at 70° C. for 30 minutes and was then filtered and drained. The polymer was then washed with ethylene dichloride at 70° C. and with water at 93° C. The product was dried for 8 hours in a vacuum oven at 60° C. The yield of polymer was 89%. The polymer had an inherent viscosity of 1.34 when measured in p-chlorophenol (containing 2% alpha pinene) at 60° C. at 0.5% weight concentration. A 0.1 gram sample of the polymer lost 44% by weight at 222° C. in 10 minutes under vacuum.

*Example 2*

Example 1 was repeated at 60° C. The polymerizing solution solidified after 10 seconds and the reaction was stopped 30 minutes after the catalyst had been added. The yield of polymer was 79%. The polymer had an inherent viscosity of 1.32 when measured in p-chlorophenol (containing 2% alpha pinene) at 60° C. at 0.5% weight concentration. A 0.1 gram sample of the polymer lost 39.0% by weight at 222° C. in 10 minutes under vacuum.

Example 3

Example 1 was repeated using 0.02 millilitre of 81% fluoroboric acid. The polymerizing solution solidified after 10 minutes and the reaction was stopped 2 hours after the catalyst was added. The yield of polymer was 86.5%. The polymer had an inherent viscosity of 1.2 when measured in p-chlorophenol (containing 2% alphapinene) at 60° C. at 0.5% weight concentration. A 0.1 gram sample of the polymer lost 28.0% by weight at 222° C. in 10 minutes under vacuum.

Example 4

Example 1 was repeated using 0.05 millilitre of 81% fluoroboric acid and 5 millilitres of ethylene oxide. Polymerization was slower than in the previous samples, and polymer did not start to form until 3 minutes after the catalyst was added. Polymerization was allowed to continue for 2 hours when it was stopped by the addition of 20 millilitres tri-n-butylamine. The yield of polymer was 86%. The polymer had an inherent viscosity of 0.8 when measured in p-chlorophenol (containing 2% alpha pinene) at 60° C. at 0.5% weight concentration. A 0.1 gram sample of the polymer lost 23% by weight at 222° C. in 10 minutes under vacuum, losing all this weight in the first 5 minutes of heating.

Example 5

A solution containing 180 grams of trioxane in 360 grams of ethylene dichloride was passed down an activated alumina column into a 700 millilitre reaction vessel fitted with a glass stirrer, a source of dry nitrogen, a rubber cap and device by which approximately 20 millilitres of reaction mixture could be repeatedly withdrawn without allowing any air or moisture into the reaction vessel. The apparatus was purged with dry nitrogen and the temperature of the stirred solution was raised to 70° C. 0.01 millilitre of 81% fluoroboric acid was injected into the solution through the rubber cap by means of a micro syringe. Polymer started to form after 25 seconds, and a sample of slurry was taken 10 minutes after the acid was added and 15 millilitres of tri-n-butylamine were then added to the contents of the reaction vessel to end the polymerization reaction. Further samples were taken 2, 5, 10 and 15 minutes after the addition of the tri-n-butylamine to test whether the time of washing the polymer with the tri-n-butylamine to remove catalyst residues affected the stability of the resultant product.

Each sample was filtered directly after it had been taken, was washed twice with ethylene dichloride, rinsed with acetone and dried in a vacuum oven at 60° C.

The remainder of the slurry was stirred with the tri-n-butylamine for a further 15 minutes after the last sample had been taken, and was washed and dried in the same manner as the samples.

The total yield of polymer was 45% based on the initial weight of trioxane in the reaction vessel. The polymer had an inherent viscosity of 1.19 when measured in p-chlorophenol (containing 2% alpha pinene) at 60° C. at 0.5% weight concentration.

0.1 gram samples of each of the samples of polymer were degraded for 10 minutes under vacuum at 222° C. The results are shown in the table below.

| Time of treatment with tri-n-butylamine mins.: | Wt. lost in 10 mins. at 222° C., percent |
|---|---|
| 0 | 24.6 |
| 2 | 40.7 |
| 5 | 25.5 |
| 10 | 24.5 |
| 15 | 26.7 |
| 30 | 31.8 |

Surprisingly it will be seen that continued treatment of the produced polyoxymethylene with the tri-n-butylamine does not bring about any improvement in its heat stability.

Example 6

The following example illustrates the continuous production of polyoxymethylene from trioxane by a process according to the present invention.

A glass split-pot reactor was fitted with a multi-socket flat flange adaptor. An anchor stirrer passed through the center socket, while a second socket admitted a wide glass polymer slurry outlet tube, the length of which determined the volume of polymerization slurry in the reaction vessel. The rest of the apparatus consisted of a 10 litre flask connected to a pump by means of thick polythene tubing and a 29 mm. glass ball and socket joint. The pump was similarly connected to an inlet port in the lid of the reaction vessel. The polymer outlet tube led directly to a sintered glass filter funnel. The clean, dry reaction vessel was placed in a thermostatically controlled oil bath at 70° C. and purged with dry nitrogen.

Dry 40% w./w. trioxane solution in ethylene dichloride, maintained under slight nitrogen pressure in the ten litre flask, was pumped at a rate of 27 millilitres per minute into the reaction vessel and stirred at constant speed. 0.01 millilitre of 81% $HBF_4$ was added every six minutes by injection through a rubber cap on one of the sockets of the lid of the reaction vessel. Polymer slurry was continuously removed through the outlet tube by means of nitrogen pressure and was immediately filtered. A fresh filter funnel was used every 20 minutes and the separate samples were washed and dried as described previously. Characteristics of the polymers are shown below.

| Sample No. | Time from Start of Run (mins.) | Inherent viscosity* |
|---|---|---|
| 1 | 45 | .310 |
| 2 | 70 | .295 |
| 3 | 93 | .480 |

*The inherent viscosity of the polymer was determined at 150° C. on a 0.5% w./v. solution of the polymer in benzyl alcohol.

I claim:
1. A process for the production of trioxane polymers which comprises polymerizing trioxane in the presence of fluoroboric acid at a temperature of from —20° C. to 180° C., and recovering the formed polymers.

2. A process according to claim 1, wherein the fluoroboric acid is added to the reaction mixture as a solution in water having a concentration of 81% by weight.

3. A process according to claim 1 wherein the polymerization is carried out under anhydrous conditions.

4. A process according to claim 1 wherein the concentration of trioxane is higher than 15% by weight and which further comprises adding an inert diluent.

5. A process according to claim 1 wherein the fluoroboric acid is present in the amount 0.001% to 0.1% based on the weight of trioxane.

6. A process according to claim 5 wherein the polymerization reaction temperature in the range of from 40° C. to 80° C.

7. A process for the production of trioxane polymers which comprises polymerizing trioxane in the presence of fluoroboric acid at a temperature of from —20° C. to 180° C. and isolating the formed polymers without using a neutralization step.

8. A process for the production of copolymers of trioxane which comprises copolymerizing trioxane with a cyclic ether having at least two adjacent carbon atoms in the presence of fluoroboric acid at a temperature of from —20° C. to 180° C. and recovering the copolymers formed.

9. A process for the copolymerization of trioxane which comprises copolymerizing trioxane and ethylene oxide in the presence of fluoroboric acid at a temperature of from —20° C. to 180° C. and recovering the copolymer formed.

10. A process according to claim 9, wherein the ethylene oxide is present in a concentration such that the resultant copolymer contains from 1 to 15% by weight of polymer units derived therefrom.

References Cited

UNITED STATES PATENTS

| | | | |
|---|---|---|---|
| 3,061,589 | 10/1962 | Codignola et al. | 260—67 |
| 3,115,480 | 12/1963 | Steadman et al. | 260—67 |
| 3,200,096 | 8/1965 | Hudgin et al. | 260—67 |
| 3,272,780 | 9/1966 | Wilson et al. | 260—67 |

FOREIGN PATENTS 1,330,593   5/1963   France.

OTHER REFERENCES

Kern et al.: Angewandte Chemie, 73 (6), March 21, 1961, pp. 177–186, QD1Z5.

WILLIAM H. SHORT, *Primary Examiner.*

L. M. PHYNES, *Assistant Examiner.*